US012013154B2

(12) United States Patent
Prahl

(10) Patent No.: US 12,013,154 B2
(45) Date of Patent: Jun. 18, 2024

(54) METHOD AND SYSTEM FOR DETERMINING A STATE OF A SOLAR-THERMAL PARABOLIC TROUGH POWER PLANT

(71) Applicant: DEUTSCHES ZENTRUM FÜR LUFT-UND RAUMFAHRT E.V., Bonn (DE)

(72) Inventor: Philipp Christoph Prahl, Grenzach (DE)

(73) Assignee: DEUTSCHES ZENTRUM FÜR LUFT- UND RAUMFAHRT E.V., Bonn (DE)

( * ) Notice: Subject to any disclaimer, the term of this patent is extended or adjusted under 35 U.S.C. 154(b) by 0 days.

(21) Appl. No.: 18/028,914

(22) PCT Filed: Sep. 15, 2021

(86) PCT No.: PCT/EP2021/075331
§ 371 (c)(1),
(2) Date: Mar. 28, 2023

(87) PCT Pub. No.: WO2022/069228
PCT Pub. Date: Apr. 7, 2022

(65) Prior Publication Data

US 2023/0332803 A1 Oct. 19, 2023

(30) Foreign Application Priority Data

Sep. 30, 2020 (DE) ..................... 10 2020 125 609.4

(51) Int. Cl.
*F24S 40/90* (2018.01)
*F24S 23/74* (2018.01)

(52) U.S. Cl.
CPC ............... *F24S 40/90* (2018.05); *F24S 23/74* (2018.05)

(58) Field of Classification Search
CPC ........ F24S 40/90; F24S 23/74; F24S 2201/00; G01M 11/005; Y02E 10/40
See application file for complete search history.

(56) References Cited

U.S. PATENT DOCUMENTS

2014/0332688 A1* 11/2014 Cothuru .................. F24S 40/90 250/353
2018/0266887 A1* 9/2018 Frank ..................... H04N 7/185

(Continued)

FOREIGN PATENT DOCUMENTS

DE 102005019367 A1 9/2006
DE 102018121243 A1 * 3/2020

(Continued)

OTHER PUBLICATIONS

Pottler, K., Lupfert, E., Johnston, G. H. G., and Shortis, M. R. (Feb. 7, 2005). “Photogrammetry: A Powerful Tool for Geometric Analysis of Solar Concentrators and Their Components .” ASME. J. Sol. Energy Eng. Feb. 2005; 127(1): 94-101. https://doi.org/10.1115/1.1824109 (Year: 2005).*

(Continued)

*Primary Examiner* — Thanh Luu
*Assistant Examiner* — Monica T Taba
(74) *Attorney, Agent, or Firm* — WRB-IP PLLC

(57) ABSTRACT

A method is provided for determining a state of a solar-thermal field with rows, arranged in parallel in a transverse direction of the field, of successively arranged parabolic trough collectors having a mirroring reflector surface, which each have, along their longitudinal extent, a focal point line in which at least one absorber pipe is arranged in each case. The following steps are performed: positioning a recording device to capture recordings at least in the infrared range at a predefined height above the field; creating, by means of the recording device, recordings of images of absorber pipes reflected by the parabolic trough collectors, the recording (Continued)

30, 32, 34
54
22
14
20
10
16
48
49
70
72 device being moved over the parabolic trough collectors in a transverse direction transverse to the longitudinal extent and the recordings being made by the recording device in the form of associated image sequences; and determining an intensity of the thermal radiation of the respective absorber pipe by means of radiometric evaluation of the recordings at least in the infrared range.

19 Claims, 9 Drawing Sheets

(56) References Cited

U.S. PATENT DOCUMENTS

| | | | | |
|---|---|---|---|---|
| 2019/0264952 | A1* | 8/2019 | Burisch | F24S 23/82 |
| 2021/0126582 | A1* | 4/2021 | Shue | B64C 39/024 |

FOREIGN PATENT DOCUMENTS

| | | | |
|---|---|---|---|
| EP | 2579017 | A1 | 2/2012 |
| EP | 3372967 | A1 | 9/2018 |
| FR | 3046511 | A1 * | 7/2017 |
| KR | 101660456 | B1 * | 9/2016 |
| WO | 2019144317 | A1 | 8/2019 |

OTHER PUBLICATIONS

International Search Report (Dec. 6, 2021) for corresponding International App. PCT/EP2021/075331.

German Official Action (Jun. 8, 2021) for corresponding German App. 10 2020 125 609.4.

Mesas-Carrascosa, Francisco Javier [u.a.]: The Development of an Open Hardware and Software System Onboard Unmanned Aerial Vehicles to Monitor Concentrated Solar Power Plants. In: Sensors, vol. 17, 2017, No. 6, 1329. Researchgate [online]. doi:10.3390/s17061329.

* cited by examiner

METHOD AND SYSTEM FOR DETERMINING A STATE OF A SOLAR-THERMAL PARABOLIC TROUGH POWER PLANT

BACKGROUND AND SUMMARY

The invention relates to a method and system for determining a state of the solar field of a parabolic trough power plant having a large number of rows, arranged in parallel in a transverse direction of the field, of parabolic trough collectors arranged in succession and having a reflective reflector surface, and a computer program product for a method for determining a state of a solar thermal field and a data processing system.

Heat losses from absorber tubes in solar thermal power plants having parabolic trough collectors, so-called parabolic trough power plants, are a critical issue in the operational management of the power plants. Absorber tubes usually have a steel tube which is coated black and in which a heat transfer fluid having a typical temperature of approximately 400° ° C. circulates. This steel tube is surrounded by an evacuated glass cladding tube for thermal insulation.

Various defects, such as fracture of the glass cladding tube, loss of vacuum, and diffusion of hydrogen into the space between the absorber and the glass cladding tube, can result in thermal energy being released back into the environment on a large scale, which can significantly reduce the efficiency of the power plant.

For this reason, the absorber tubes have to be checked regularly, which is complex: a parabolic trough power plant having thermal energy storage for 8 hours typically has more than 22,500 absorber tubes. The quality of the insulation can be derived from the condition of the glass cladding tube, in particular from its surface temperature. Current routine practice in such a power plant is to manually measure the surface temperature of the glass cladding tube using thermal cameras.

Airborne methods have also been developed as an alternative to manual methods. Because of the small tube diameter, recordings of the absorber tubes are made from a low height of a few meters above ground, for example a maximum of 15 m above ground. Absorbers can thus be identified in relatively poorly resolved infrared (IR) images and the absolute raw glass cladding temperature can be measured with an accuracy of 2-5 K.

EP 2579017 B1 discloses a method for positioning a device for monitoring a parameter of parabolic trough collectors of a solar thermal field from the air by an unmanned aircraft having a position estimation module. In this case, an image of an absorber tube is captured by means of an imaging device of the position estimation module. The device can have an infrared camera for recording an absorber tube.

It is desirable to provide a quick and inexpensive method for determining a state of a solar thermal field, in particular for determining temperatures of absorbers of parabolic trough collectors.

It is also desirable to specify a simple and inexpensive system for carrying out such a method.

It is also desirable to specify a computer program product and a data processing system for executing such a method.

According to a first aspect of the invention, a method is proposed for determining a state of a solar thermal field having large number of rows, arranged in parallel in a transverse direction of the field, of parabolic trough collectors arranged in succession and having a reflective reflector surface, which each have a focal line, in each of which at least one absorber tube is arranged, along their longitudinal extension.

At least the following steps are carried out:

- positioning at least one recording device for capturing recordings at least in the infrared range at a predetermined height above the field;
- creating recordings of images of absorber tubes, which are reflected by the surface of the respective parabolic trough collectors, by way of the recording device at least in the infrared range, wherein the recording device is moved in a transverse direction transverse to the longitudinal extension over the parabolic trough collectors and the recordings are performed in the form of coherent image sequences by the recording device; and
- determining an intensity of the thermal radiation of the respective absorber tube by radiometric evaluation of the recordings of the images of absorber tubes, which are reflected by the surface of the respective parabolic trough collectors, at least in the infrared range.

According to an aspect of the invention, a rapid method for determining the states of the absorber tubes and for determining the relative temperature of the glass cladding tubes of the absorber tubes is provided. Furthermore, data from unmanned aircraft, such as drones, are used in this method.

A significant advantage is in the indirect detection of defective absorber tubes via the reflection of the glass cladding tube on the reflective surface of the respective parabolic trough collector.

The use of a flight altitude of approx. 120 m instead of a few meters above ground, as in the prior art, and a flight route transversely in an east-west direction, i.e., transversely to the parabolic trough collectors instead of longitudinally in a north-south direction, as in the prior art, have important advantages. The data collected in this way are evaluated by radiometrically examining the reflection, the image of the absorber tube on the reflective surface of the parabolic trough collector.

An image signal of an absorber tube is thus available, which typically has a length of 4 m and a diameter of 0.12 m, on a size of approximately 6 m×4 m, instead of 0.12 m×4 m, which enables elevating the flight route and thus accelerating the method.

In addition, there is no need to determine absolute temperatures as accurately as possible, the values of which also depend heavily on the ambient conditions. Rather, relative temperatures can be determined, which is initially sufficient for the assessment of the solar thermal field.

Another advantage is in the use of inexpensive infrared cameras and a commercially available inexpensive drone to carry out the recordings. It is possible to use "hobby drones", which are characterized by very simple handling and low costs.

The method according to an aspect of the invention is characterized by a very short measurement time. Increasing the flight altitude results in savings by a factor of ten in the method according to an aspect of the invention, so that the state of a solar thermal field of normal size can typically be determined in four flights, each having a flight time of approximately 15 minutes.

A possible largely fully automatic evaluation of the measurement data is also advantageous. During a measurement, for example, a maximum of eight different image sequences, which are coherent as such, are recorded. The previously typical manual pre-orientation of the respective first individual image, also known as the frame, of the image sequence can be automated.

Another advantage is that the measured data are less influenced by ambient radiation. The detection of the indirect infrared radiation reflected to the camera via the parabolic trough collector is accompanied by decisive advantages. The camera only receives the radiation that leaves the surface of the absorber tube perpendicularly. As a result, spatial filtering of both the angle-dependent emissivity and the background radiation takes place with the recording. The background is therefore completely neutral, since only the cold sky is seen and the profile of the absorber tube captured with the recording, i.e., the cross section through the absorber tube, is very homogeneous. The reflectance of the reflective surface of the parabolic trough collector can be taken into consideration in the corresponding spectral range in order to quantify the attenuation of the measurement signal.

In the prior art, the state detection and operation and maintenance of solar thermal parabolic trough power plants is characterized by a high level of manual effort and insufficient data. In particular, the heat losses of the absorber tubes represent an unsolved problem.

Using the method according to an aspect of the invention, it is possible for the first time to offer this measurement in a robust, cost-effective manner and, depending on the hardware used, having very good accuracy. Advantageously for the operator, the measurement can be carried out weekly, but at least monthly, due to the shortened measurement duration. As a result, acute damage and degradation processes can be logged or emerging damage can be detected at an early stage.

The method may be integrated into all existing power plants as part of the operating routine. Another possibility is to integrate the method as software into the operating routine.

According to a favorable embodiment of the method, an enlarged representation of the absorber tubes can be generated as a development of the imaging of the absorber tubes on the surface of the parabolic trough collector. An image signal of an absorber tube is represented by the imaging of the absorber tube on the reflective surface of the parabolic trough collector. A commercially available absorber tube typically has a length of 4 m and a diameter of 0.12 m. Using the method according to an aspect of the invention, the absorber tube can be represented by the recording technique as a development of the imaging at a size of approximately 6 m×4 m instead of the previous 0.12 m×4 m. This means that a much larger recording distance can be set by a higher flying altitude, due to which the measurement of the entire field can be accelerated significantly.

According to a favorable embodiment of the method, the at least one recording device for capturing recordings at least in the infrared range can be positioned at a predetermined height above the field such that a segment of the field having a plurality of parabolic trough collectors arranged in parallel is captured simultaneously by the recording device. The simultaneous recording of several parabolic trough collectors can advantageously shorten the measurement time for determining the state of the entire solar thermal field.

According to a favorable embodiment of the method, the at least one recording device can be designed for recordings in the visible range and in the infrared range. At least the following steps can be carried out:

- positioning the at least one recording device for capturing recordings in the visible range and in the infrared range at the predetermined height above the field;
- creating recordings of images of absorber tubes, which are reflected by the surface of the respective parabolic trough collectors, by way of the recording device in the visible range and in the infrared range, wherein the recording device is moved in a transverse direction transverse to the longitudinal extension over the parabolic trough collectors; and
- determining the intensity of the thermal radiation of the respective absorber tube by radiometric evaluation of the recordings in the visible range and in the infrared range.

By combining image information in the visible range (RGB range) with image information in the infrared range (IR range), infrared cameras having a lower image resolution can also advantageously be used. This allows significant cost advantages to be achieved when designing the measuring system. Such infrared cameras also require relatively little installation space and have a favorable low weight.

It is advantageous to extract individual images that are synchronized as well as possible from the video recordings of the recording device. Using suitable software, individual images can be extracted from the video recordings with the lowest possible compression losses.

The cameras in the visible range and in the infrared range usually work with different image frequencies, so it is advantageous to synchronize the individual images as well as possible. Typically, an RGB camera operates at 30 Hz, while an IR camera, for example, operates at 8.7 Hz.

According to a favorable embodiment of the method, at least the following steps can be carried out for the radiometric evaluation of the recordings in the visible range and/or in the infrared range:

- reading in temperature data of the heat transfer fluid at the point in time of the recordings;
- determining a position of the recording device relative to the respective absorber tube;
- creating orthoimages of an aperture surface of the respective parabolic trough collector from the recordings in the visible range and/or in the infrared range; and
- determining the geometry of the respective parabolic trough collector, and tracking the respective parabolic trough collector according to the position of the sun from the position of the recording device and the orthoimages.

Orthoimages are to be understood as the, at least largely, distortion-free and true-to-scale imaging of the aperture surface of the parabolic trough collector. Orthoimages can be generated for the IR range and the visible RGB range.

The position of the recording device relative to the respective parabolic trough collector can be determined, for example, via methods of image processing and photogrammetric bundle block adjustment, as is known, for example, from DE 102011080969 A1.

There it is described that in the case of images taken from the air, the three-dimensional position of each characteristic shape can be determined via a new photogrammetric evaluation of the images using the two-dimensional image coordinates of a marking and the two-dimensional image coordinates of the characteristic shape.

Expediently, the recordings can be evaluated by determining the camera position and obtaining orthoimages from suitable perspectives. For this purpose, for example, power plant data are read from a database in order to know in particular the temperature of the heat transfer fluid at the time of the measurement. The camera position is determined relative to the solar field. Orthoimages are created from the items of information. The geometry of the parabolic trough collector and the tracking of the parabolic trough collector are then calculated based on the position of the sun from the camera position and the orthoimages. In this way, correct execution of the tracking process of the parabolic trough collector can be checked and, if necessary, corrected.

According to a favorable embodiment of an aspect of the invention, if recordings in the visible range are taken into consideration, the recording device can be optically calibrated for a geometric transformation of the recordings in the visible range and/or in the infrared range.

In particular, cameras of the recording device can be calibrated via a photogrammetric approach.

In order to be able to carry out a geometric transformation between recordings in the visible range (RGB recordings) and in the infrared range (IR recordings), the cameras are calibrated before the measurement. This calibration may be implemented for the RGB recordings using a photogrammetric approach.

This is not practical for the infrared camera due to the low resolution. Here, the necessary data for creating the transformation can be obtained by generating control points in recordings using the RGB camera and the infrared camera, which are visible in both the optical and in the thermal ranges.

According to a favorable embodiment of the method, at least the following steps can be carried out to determine the intensity of the thermal radiation of the absorber tube: if recordings in the visible range are taken into consideration, two-dimensionally transforming the recording in the visible range into the recording in the infrared range and superimposing the two recordings;

- creating the orthoimages in the visible range and/or in the infrared range from the recordings in the visible range and/or infrared range; spatially assigning the image information of the orthoimages to the respective absorber tube; and
- determining the intensity of the thermal radiation of the respective absorber tube by averaging the image information of the orthoimage in the infrared range in a longitudinal extension of the respective absorber tube.

A two-dimensional transformation of the imaging from the RGB image to the IR image can advantageously be carried out. Using a transformation matrix determined by calibrating the cameras, the two-dimensional coordinates of the RGB orthoimage can be converted into the IR image.

According to a favorable embodiment of the method, the following steps can furthermore be carried out to determine the intensity of the thermal radiation of the respective absorber tube: summing and averaging the intensity values of orthoimages recorded at an angle offset in the transverse direction in the infrared range over the longitudinal extension of the respective absorber tube;

- correcting the intensity values by eliminating the background radiation; and
- deriving the intensity of the thermal radiation from the averaged and corrected intensity values.

Cross sections and histograms can advantageously be created and analyzed in order to quantify the intensity of the thermal radiation of the absorber tube, which is received in this way. A scalar value for the intensity of the thermal radiation and its variation can be determined from the IR orthoimages. For this purpose, the intensity values in the longitudinal direction of the parabolic trough collector are summed and averaged within a mask of the orthoimage. The resulting profile is largely filtered of image noise. A fit to the flanks of the intensity values makes it possible to distinguish the background from the foreground and to identify the area of reflection, i.e., the imaging of the absorber tube. In this way, the mean value and standard deviation of the intensity of the thermal radiation can now be derived.

According to a favorable embodiment of the method, at least the following steps can be carried out to determine an absolute temperature of the respective absorber tube:

- if the recording device has non-radiometric infrared cameras, assigning the minimum and maximum intensity values of the orthoimages in the infrared range to predetermined expected values and interpolating intermediate value; and
- if the recording device has radiometric infrared cameras, correcting an emissivity, the background radiation, and a reflectance of the surface of the respective parabolic trough collector.

Correction functions can also advantageously be created and used in order to arrive at relative and, if possible, absolute temperature values of the absorber tubes, in particular in the case of non-radiometric infrared cameras. Even if the main goal of the method described is the classification of the absorber tubes, absolute temperatures can definitely be determined with the aid of certain assumptions. Depending on the quality of the IR raw data (radiometric or non-radiometric, dynamic, and the like), different steps are proposed for this purpose:

With non-radiometric cameras, the measured intensity values do not correspond to absolute temperature values. However, an assignment can take place here by assigning the minimum and maximum intensity values to certain expected values which, with given boundary conditions (temperature of the heat transfer fluid and ambient temperature), correspond to the typical temperatures of the absorber tubes. Ranges in between can be interpolated.

With radiometric cameras, in addition to the emissivity, the background radiation and the reflectance of the reflective surface of the parabolic trough collector in the IR range can also be corrected in order to obtain absolute temperatures within measurement uncertainties.

According to a favorable embodiment of the method, the intensity of the thermal radiation and a width of a rectangular integral of the intensity values of the orthoimage in the infrared range (IR range) of the respective absorber tube can be determined to classify the respective absorber pipe according to heat loss. Even without the use of correction functions, the absorber tubes can be divided into classifications by determining the intensity of the thermal radiation and the diameter of the intensity profiles via the width of a rectangular function determined in the orthoimage of the imaging of the respective absorber tube.

According to a favorable embodiment of the method, the recordings can be created by the recording device directly after sunset.

Carrying out the measurement using recordings of video sequences in the RGB range and in the IR range can expediently take place in such a way that a suitable time, preferably after sunset, particularly preferably directly after sunset, is selected, because then the solar field is still at operating temperature and practically still has not cooled down. The heat transfer fluid then usually has a temperature of at least 250° C. This is advantageous because increased heat losses can only be detected if there is a sufficient difference between the temperature of the heat transfer fluid and the ambient temperature. Operation is not disturbed by the measurement. The lighting conditions allow for a very robust evaluation.

Directly after sunset, there are also favorable conditions with regard to the contrast in the RGB recordings. The camera settings can advantageously correspond to the temperature range to be expected, in particular in the IR recording, in order to optimally resolve the relatively weak contrast.

According to a favorable embodiment of the method, the recording device can be positioned over the solar thermal field by means of an unmanned aircraft.

For example, drones having a payload that corresponds to a so-called dual camera are advantageously suitable for the proposed method. These are, for example, two cameras integrated in the same body and aligned collinearly, one of which is sensitive to the infrared (IR) range, while the other camera enables recordings in the visible (RGB) range. A suitable spectral range of the IR camera, in which the glass tubes of the absorbers are typically opaque and no longer transparent, is in a spectral band of 8-14 μm, which is typical for uncooled VOx microbolometers.

According to a favorable embodiment of the method, the recordings can be created by means of a meandering flight pattern over the solar thermal field.

These flight routes largely correspond to the simple meandering flights at an altitude of approximately 120 m, from east to west over the solar field. The video films are recorded along the routes in an east-west direction.

According to a favorable embodiment of the method, the recordings can be created during a flight movement in the transverse direction of the parabolic trough collectors of the solar thermal field. Since the parabolic trough collectors are usually oriented in the north-south direction with their longitudinal extension, the flight movement takes place in the transverse direction in the east-west direction.

According to a favorable embodiment of the method, the recordings can be made at a flight altitude of at least 100 m, preferably at a flight altitude of approximately 120 m. The relatively high flight altitude for drones can be selected due to the enlargement of the images of the absorber tube by the imaging on the reflective surface of the parabolic trough collector. As a result, multiple parabolic trough collectors can be captured simultaneously, due to which the measurement time may advantageously be shortened.

According to a further aspect of the invention, a system is proposed for determining a state of a solar thermal field having a large number of rows of parabolic trough collectors, which are arranged in succession and have a reflective reflector surface, arranged in parallel in a transverse direction of the field. The system comprises at least one recording device for recordings at least in the infrared range, in particular for recordings in the visible range and in the infrared range; and an unmanned aircraft on which the recording device is arranged.

For example, drones having a payload that corresponds to a so-called dual camera are advantageously suitable for the proposed system. These are two cameras integrated in the same body and aligned collinearly, one of which is sensitive to the infrared (IR) range, while the other camera enables recordings in the visible (RGB) range.

In an alternative embodiment, however, it is also possible to use separate cameras in the RGB range and in the IR range.

According to a favorable embodiment of the system, the unmanned aircraft can be designed to fly a meandering flight pattern over the solar thermal field, in particular to fly autonomously.

These flight routes largely correspond to the simple meandering flights at an altitude of approximately 120 m, from east to west over the solar field. The video films are recorded along the routes in an east-west direction. Advantageously, the flight route can be programmed into the system in advance or transmitted wirelessly, so that the entire measurement process can take place autonomously. Automatic take-off and landing of the aircraft is also possible.

According to a favorable embodiment of the system, the unmanned aircraft can be designed to fly at a flight altitude of at least 100 m, preferably at a flight altitude of approximately 120 m, above the solar thermal field.

The relatively high flight altitude for drones can be selected due to the enlargement of the images of the absorber tube by the imaging on the reflective surface of the parabolic trough collector. As a result, multiple parabolic trough collectors can be captured simultaneously, due to which the measurement time may advantageously be shortened.

According to a further aspect of the invention, a computer program product is proposed for a method for determining a state of a solar thermal field having large number of rows, arranged in parallel in a transverse direction of the field, of parabolic trough collectors arranged in succession and having a reflective reflector surface, which each have a focal line, in each of which at least one absorber tube is arranged, along their longitudinal extension.

The computer program product comprises at least one computer-readable storage medium, which comprises program instructions that or executable on a computer system and cause the computer system to carry out the method.

At least the following steps are carried out:

positioning at least one recording device for capturing recordings at least in the infrared range at a predetermined height above the field;

creating recordings of images of absorber tubes, which are reflected by the surface of the respective parabolic trough collectors, by way of the recording device at least in the infrared range, wherein the recording device is moved in a transverse direction transverse to the longitudinal extension over the parabolic trough collectors and the recordings are performed in the form of coherent image sequences by the recording device; and determining an intensity of the thermal radiation of the respective absorber tube by radiometric evaluation of the recordings of the images of absorber tubes, which are reflected by the surface of the respective parabolic trough collectors, at least in the infrared range.

According to a further aspect of the invention, a data processing system for executing a data processing program is proposed, which comprises computer-readable program commands for carrying out a method for determining a state of a solar thermal field having a large number of rows, arranged in parallel in a transverse direction of the field, of parabolic trough collectors arranged in succession and having a reflective reflector surface, which each have a focal line, in each of which at least one absorber tube is arranged, along their longitudinal extension.

BRIEF DESCRIPTION OF THE DRAWINGS

Further advantages will be apparent from the description of the drawings. Exemplary embodiments of the invention are shown in the figures. The figures, the description, and the claims contain numerous features in combination. A person skilled in the art will expediently also consider the features individually and combine them into further meaningful combinations.

In the exemplary figures.

DETAILED DESCRIPTION

In the figures, identical or identically acting components are identified by the same reference signs. The figures only show examples and are not to be understood as restrictive.

Directional terminology used in the following with terms such as "left", "right", "above", "below", "in front of", "behind", "after", and the like only serves for better comprehension of the figures and is in no way intended to restrict the generality. The components and elements shown, their design and use can vary according to the considerations of a person skilled in the art and can be adapted to the respective applications.

Figure 1:
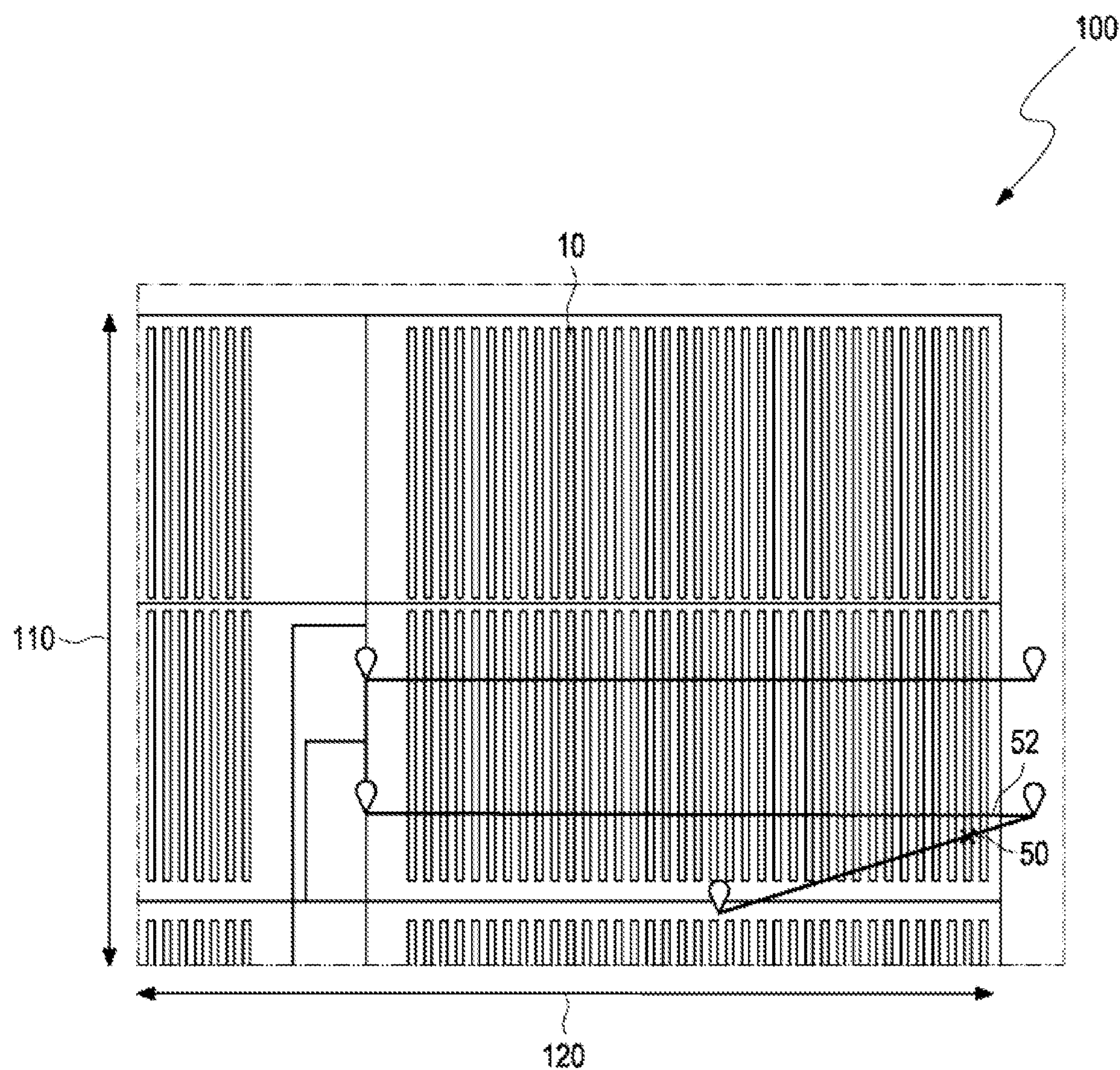
FIG. 1 shows a solar thermal field having a large number of parabolic trough collectors with a superimposed flight pattern for carrying out a method for determining a state of the field according to an exemplary embodiment of the invention.

FIG. 1 shows a solar thermal field 100 having a large number of parabolic trough collectors 10 with a superimposed flight pattern 52 for carrying out a method for determining a state of the field 100 according to an exemplary embodiment of an aspect of the invention.

The field 100 has a large number of rows of parabolic trough collectors 10 which succeed one another in a longitudinal direction 110 of the field 100, wherein the rows are arranged in parallel in a transverse direction 120 of the field 100. The parabolic trough collectors 10 each have a reflective reflector surface 16, each of which has a focal line 14 along its longitudinal extension 72, in which at least one absorber tube 20 is arranged in each case.

Figure 2:
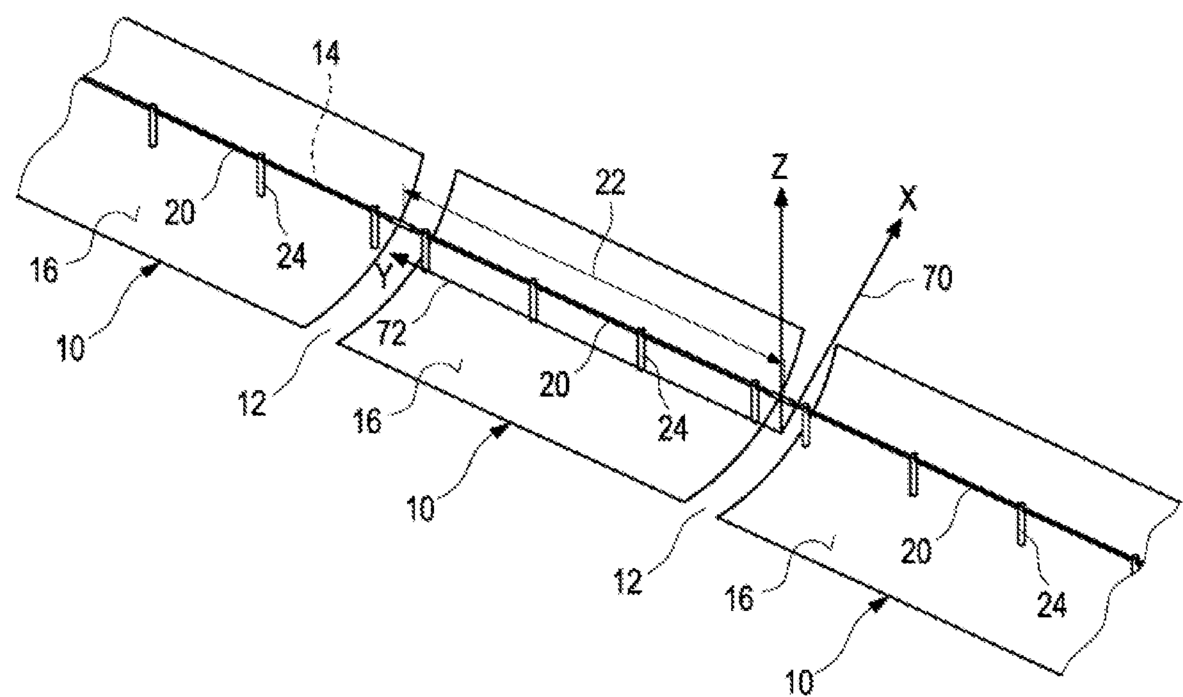
FIG. 2 shows a row having parabolic trough collectors according to FIG. 1 arranged in succession in a longitudinal direction of the field.

For this purpose, FIG. 2 shows a row of parabolic trough collectors 10 from FIG. 1 arranged in succession in a longitudinal direction 110 of the field 100, which are each separated by a pylon for mounting 12.

Figure 3:
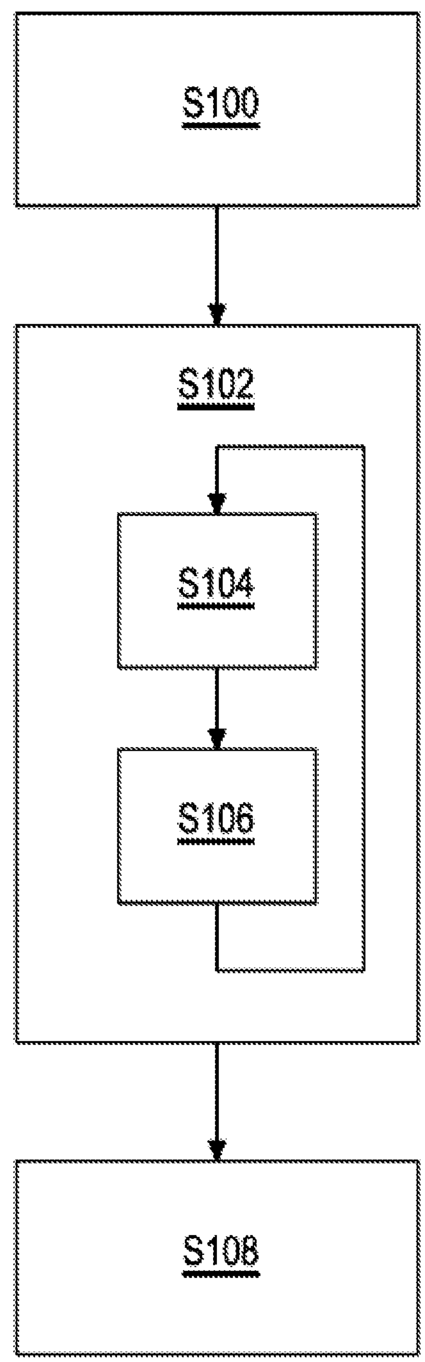
FIG. 3 shows a flow chart of a method according to an exemplary embodiment of the invention.

FIG. 3 shows a flow chart of the method according to an exemplary embodiment of an aspect of the invention. The method according to an aspect of the invention provides that at least the following steps are carried out:

- positioning at least one recording device 30 for capturing recordings 44 at least in the infrared range at a predetermined height 54 above the field 100 in a first step $100;
- creating recordings 44 of images of absorber tubes 20, which are reflected by the surface 16 of the respective parabolic trough collectors 10, by way of the recording device 30 at least in the infrared range in step S102, wherein the recording device 30 is moved in a transverse direction 70 transverse to the longitudinal extension 72 over the parabolic trough collectors 10 in step S104 and the recordings 44 are performed in the form of coherent image sequences by the recording device 30 in step S106; and therefrom determining an intensity 60 of the thermal radiation of the respective absorber tube 20 by radiometric evaluation of the recordings 44 of the images of absorber tubes 20, which are reflected by the surface 16 of the respective parabolic trough collectors 10, at least in the infrared range in step S108.

Steps S104 and S106 are carried out continuously during a flight of the recording device 30 over the field 100 using an aircraft 50.

In particular, the recording device can be designed not only for infrared recordings (IR recordings), but also for recordings in the visible range (RGB recordings). By combining image information in the visible range with image information in the infrared range, infrared cameras having a lower image resolution can also advantageously be used. This allows the image processing to determine the camera position to be carried out in the significantly higher-contrast and better-resolution RGB images. This allows significant cost advantages to be achieved when designing the measuring system. Such infrared cameras also require less installation space and are lighter in weight, which is advantageous for operation.

For this purpose, the flight pattern 52 for collecting the data required for the method described here is shown in FIG. 1. The recording device 30 is positioned over the solar thermal field 100 by means of an unmanned aircraft 50. The recordings are created by means of a meandering flight pattern 52 over the solar thermal field 100. The flight movement takes place in the transverse direction 70 of the parabolic trough collectors 10 of the solar thermal field 100. The recordings 42, 44 are taken at a flight altitude 54 of at least 100 m, preferably at a flight altitude 54 of approximately 120 m, in image sequences. The video films are recorded along the routes in the transverse direction 120, thus in an east-west direction. The creation of the recordings 42, 44 by the recording device 30 is advantageously carried out directly after sunset.

The recording device 30 for capturing recordings 44 at least in the infrared range can be positioned at a predetermined height 54 above the field 100 such that a segment of the field 100 having a plurality of parabolic trough collectors 10 arranged in parallel is captured simultaneously by the recording device 30.

In FIG. 2, the parabolic trough collectors 10 are arranged, which succeed one another in a longitudinal extension 72 and are identified by Y and have a reflective reflector surface 16, which each have a focal line 14 along their longitudinal extension 72, in which at least one absorber tube 20 is arranged in each case. The absorber tubes 20 are connected to the parabolic trough collector 10 via holders 24. An absorber tube 20 typically has a longitudinal extension 22 of 4 m. The transverse direction 70, identified by X, in which the recordings are made using the recording device 30, is also marked.

Figure 4:
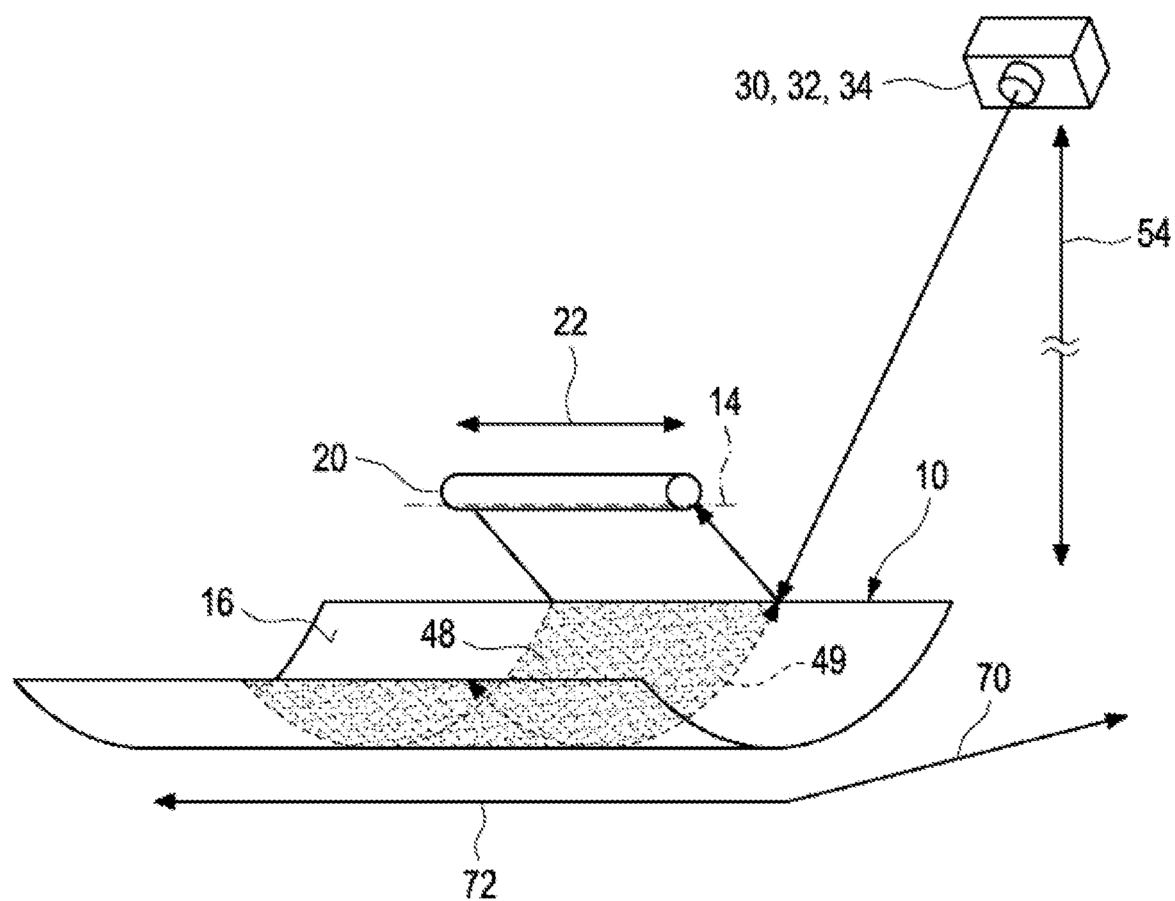
FIG. 4 shows a schematic representation of the positioning of the recording device in relation to a parabolic trough collector when carrying out the method according to the invention, as well as the position of the reflection of the absorber tube in the mirror surface at a given position of the recording device.

FIG. 4 shows a schematic representation of the positioning of the recording device 30 in relation to a parabolic trough collector 10 when the method according to an aspect of the invention is being carried out. When flying over the parabolic trough collector 10, the recording device 30 sees an enlarged representation of the absorber tubes 20 in the direction of flight as a development 49 of the imaging 48 of the absorber tubes 20 on the surface 16 of the parabolic trough collector 10.

The use of a flight altitude 54 of approximately 120 m above ground and a flight route 52 transversely in an east-west direction, i.e., transversely to the parabolic trough collectors 20 instead of longitudinally in a north-south direction, as in the prior art, have important advantages.

The data collected in this way are evaluated by radiometrically examining the reflection, the image 48 of the absorber tube 20 on the reflective surface 16 of the parabolic trough collector 20. By imaging the absorber tube 20 on the reflective surface 16 of the parabolic trough collector 10, an image signal of an absorber tube 20, which typically has a length of 4 m and a diameter of 0.12 m, is shown approximately 6 m×4 m in size instead of previously 0.12 m×4 m.

At least the following steps are carried out for the radiometric evaluation of the recordings 42, 44 in the visible range and/or in the infrared range:

- reading in temperature data of the heat transfer fluid at the point in time of the recordings 42, 44;
- determining a position of the recording device 30 relative to the respective absorber tube 20;
- creating orthoimages 43, 45 of an aperture surface of the respective parabolic trough collector 10 from the recordings 42, 44 in the visible range and/or in the infrared range; and
- determining the geometry of the respective parabolic trough collector 10, and tracking the respective parabolic trough collector 10 according to the position of the sun from the position of the recording device 30 and the orthoimages 43, 45.

In order to be able to assign the intensity to a specific absorber tube 20 in the IR orthoimages 45, the areas on the surface 16 that show the reflection of a specific absorber tube 20 are determined with the aid of the relative position of the recording device 30, the reflective surface 16 of the parabolic trough collector 10, and the absorber tube 20 show as shown in FIG. 4.

If recordings 42 in the visible range are taken into consideration, the recording device 30 is optically calibrated for a geometric transformation of the recordings 42, 44 in the visible range and/or in the infrared range. In particular, the cameras 32, 34 of the recording device 30 can be calibrated via a photogrammetric approach.

At least the following steps are carried out to determine the intensity 60 of the thermal radiation of the absorber tube 20:

- if recordings 42 in the visible range are taken into consideration, two-dimensionally transforming the recording 42 in the visible range into the recording in the infrared range 44 and superimposing the two recordings 42, 44;
- creating the orthoimages 43, 45 in the visible range and/or in the infrared range from the recordings 42, 44 in the visible and/or infrared range;
- spatially assigning the image information of the orthoimages 43, 44 to the respective absorber tube 20; and
- determining the intensity 60 of the thermal radiation of the respective absorber tube 20 by averaging the image information of the orthoimage 45 in the infrared range in a longitudinal extension 22 of the respective absorber tube 20.

Furthermore, to determine the intensity 60 of the thermal radiation of the respective absorber tube 20, in a first step the summation and averaging of the intensity values of orthoimages 45 recorded with an angle offset in the transverse direction 70 in the infrared range over the longitudinal extension 22 of the respective absorber tube 20 are carried out. Correcting the intensity values by eliminating the background radiation then takes place in a further step. Deriving the intensity 60 of the thermal radiation from the averaged and corrected intensity values takes place as the last step.

Figure 5:
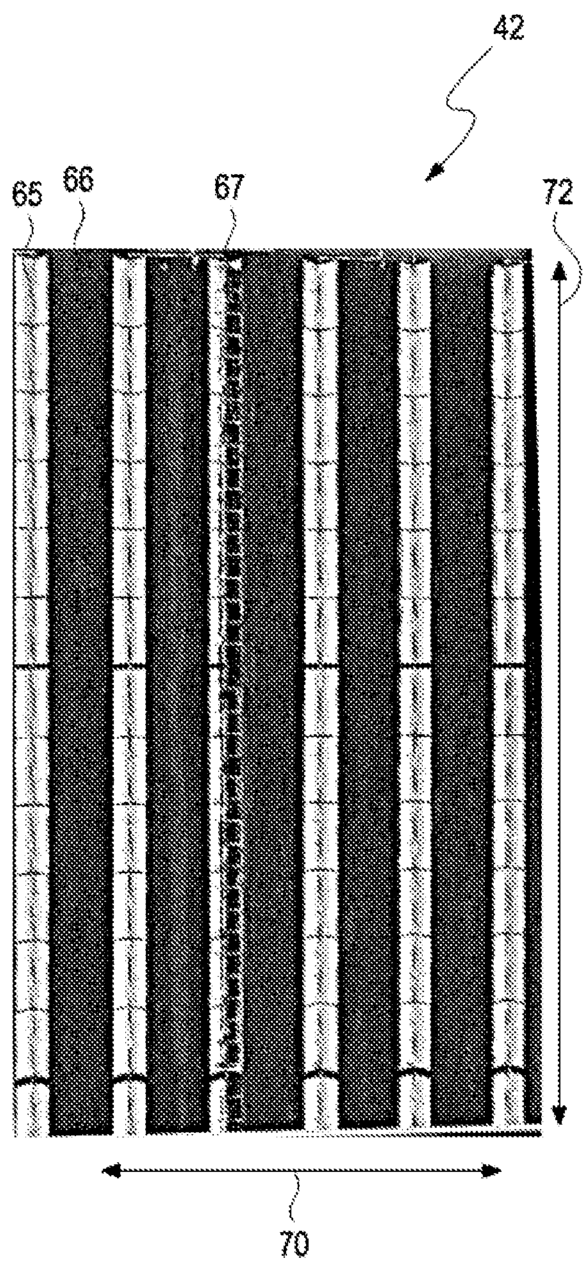
FIG. 5 shows recordings of parabolic trough collectors arranged in parallel in the visible range according to the method according to the invention.
Figure 6:
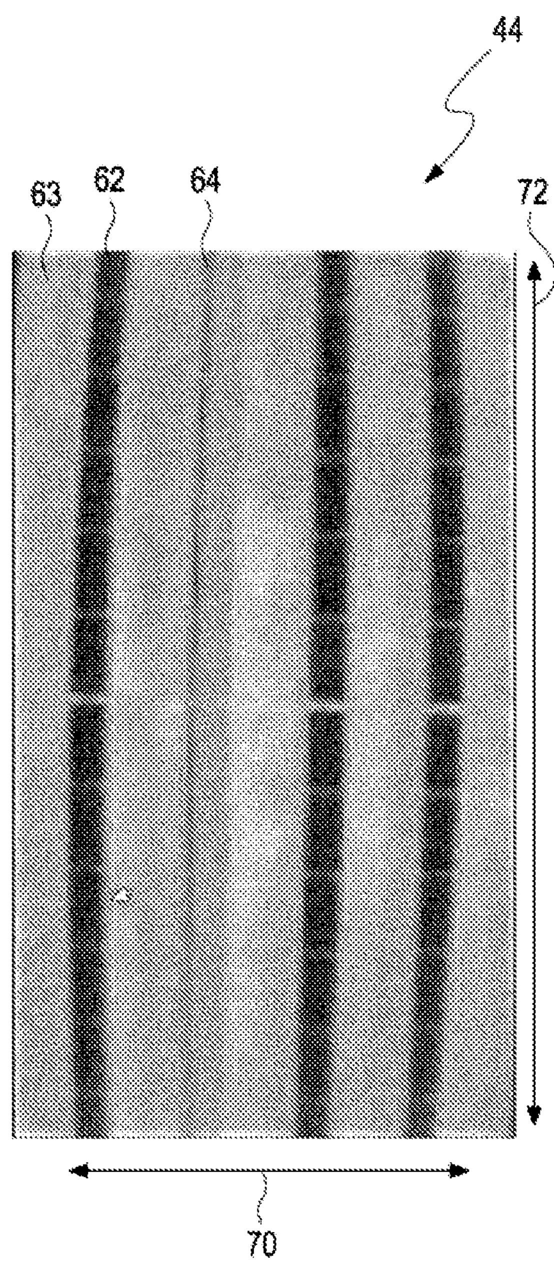
FIG. 6 shows recordings of parabolic trough collectors arranged in parallel in the infrared range according to the method according to the invention.

FIGS. 5 and 6 show recordings 42, 44 of parabolic trough collectors 10 arranged in parallel in the visible range (FIG. 5) and in the infrared range (FIG. 6) according to the method according to an aspect of the invention.

Light stripes 65 in the RGB image 42 in FIG. 5 correspond to a reflection of the sky, dark stripes 66 represent the ground. In the IR recording 44 in FIG. 6, light stripes 63 correspond to the warm ground, while the sky is represented as a dark stripe 62 due to the low temperature in the IR range. A shadow line 67 in the RGB recording 42 in FIG. 5 corresponds to the imaging of an absorber tube 20, which is also imaged as a shadow 64 in the IR recording 44 in Figure The glass cladding tube of an absorber tube 20 appears opaque in the IR recording 44. This can depend on the glass type and the spectral band of the IR camera.

Figure 7:
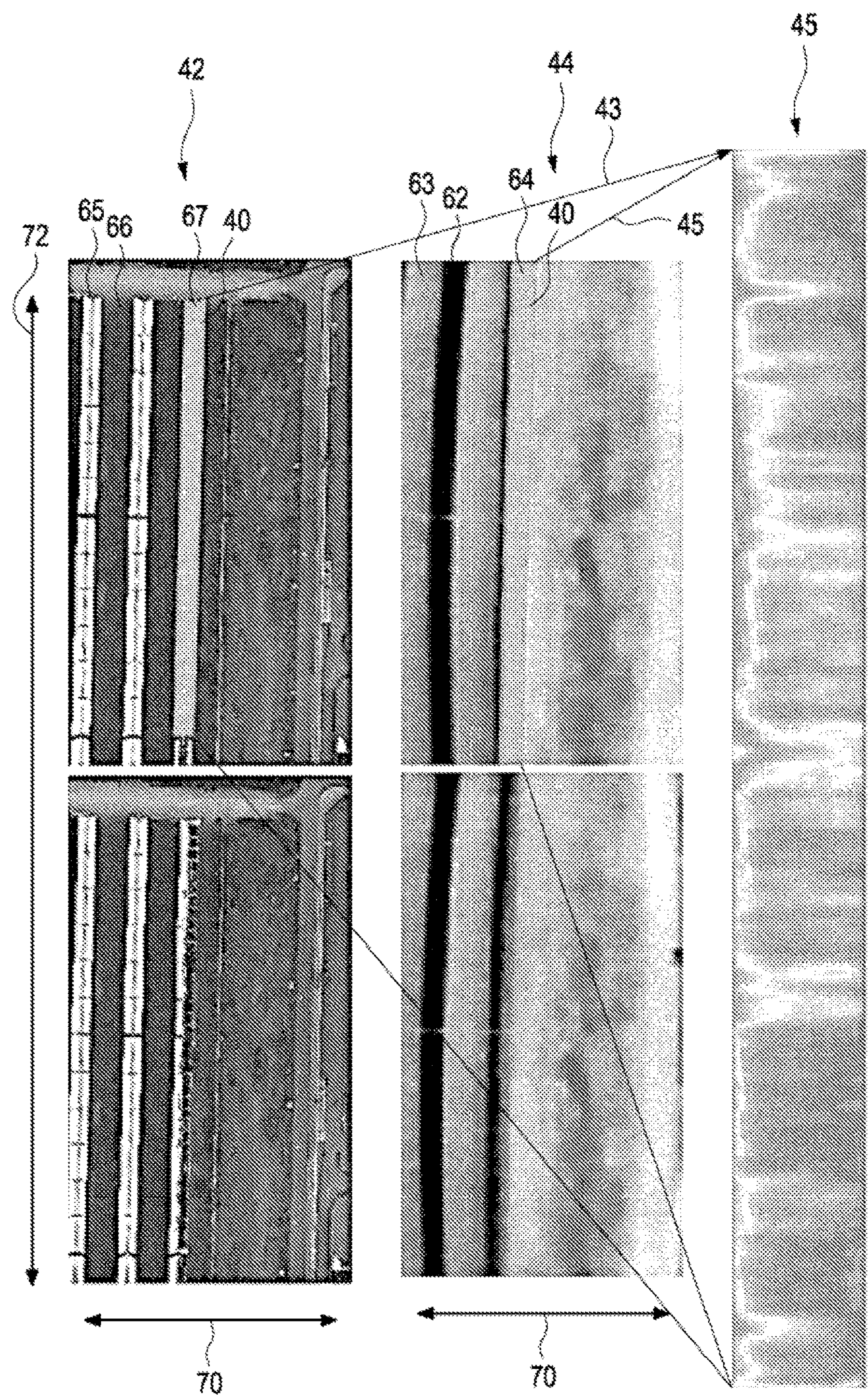
FIG. 7 shows images of parabolic trough collectors arranged in parallel in the visible range and in the infrared range together with an orthoimage extracted therefrom in the infrared range according to the method according to the invention.

FIG. 7 shows juxtaposed recordings 42, 44 of parabolic trough collectors 10 arranged in parallel in the visible range (on the left in the figure) and in the infrared range (in the middle of the figure) together with an orthoimage 45 extracted therefrom in the infrared range (on the right in the figure).

RGB recordings 42 and IR recordings 44 are each partially superimposed with a mask 40 for generating the orthoimages 43, 45. This mask 40 is not yet correctly placed in the IR recording 44 because of the insufficient correction of the radially symmetrical distortion. The brightness variation of the IR orthoimage 45 generated by means of the RGB orthoimage 43 provides information about the state of the absorber tubes 20.

Figure 8:
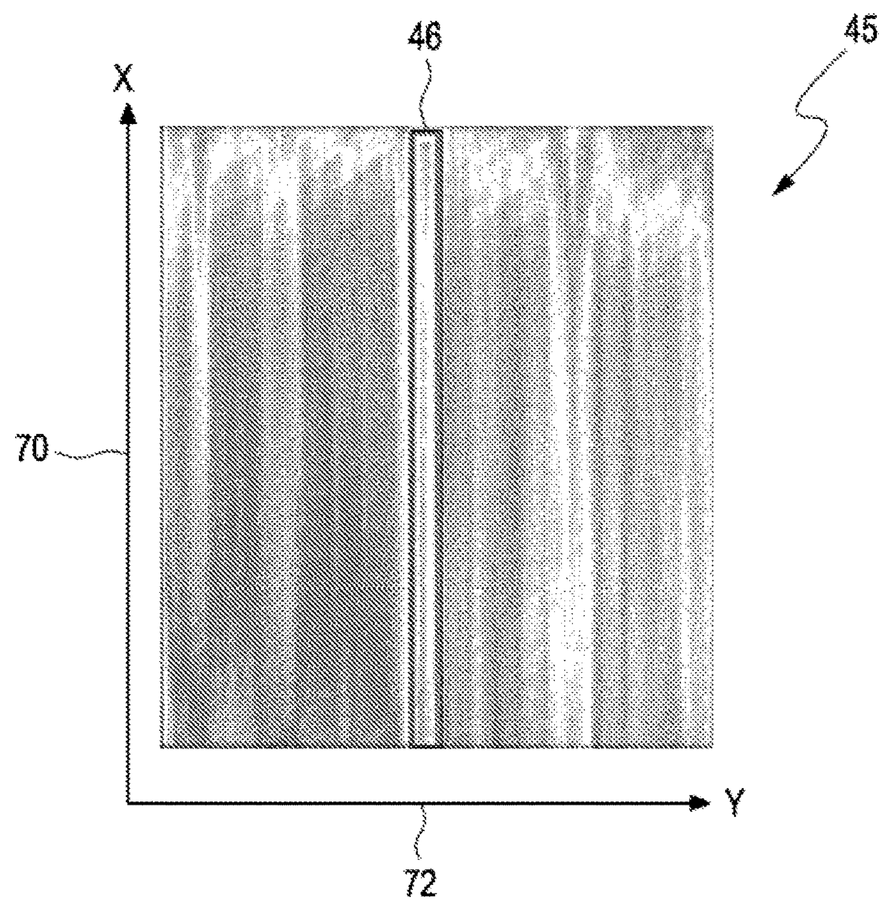
FIG. 8 shows an orthoimage in the infrared range with selection of the intensity for a specific absorber tube according to an exemplary embodiment of the invention.

An orthoimage 45 in the infrared range with selection 46 of the intensity for a specific absorber tube 20 is shown in FIG. 8. The orthoimage 45 is strongly compressed in the longitudinal direction 72 in comparison to the transverse direction 70. In the transverse direction 70, the orthoimage 45 corresponds to the development 49 (FIG. 4) of the imaging of an absorber tube 20 on the reflective reflector surface 16 of the parabolic trough collector 10 of approx 6 m. In the longitudinal direction 72, the orthoimage 45 corresponds, for example, to 36 parabolic trough collectors 10 each having a length of approximately 4 m and thus, including the separations 12 (FIG. 2) between the parabolic trough collectors 10, covers a width of approximately 150 m.

In this special case, the orthoimage 45 shown does not reproduce a rectangular function, since the reflection fills the entire reflective surface 16 of the parabolic trough collector 10. In a series of orthoimages 45, however, it can be observed how the reflection runs into the surface 16 from one side and out again on the other side. In this way, reflection and background can be distinguished very well.

Cross sections and histograms can advantageously be created and analyzed in order to quantify the intensity of the thermal radiation of the absorber tube 20, which is received in this way.

A scalar value for the intensity 60 of the thermal radiation and its variation can be determined from the IR orthoimages 45. For this purpose, the intensity values 60 in the longitudinal direction of the parabolic trough collector 20 are summed and averaged within a mask 40 of the orthoimage 45. The resulting profile is largely free of image noise. A fit to the flanks of the intensity values 60 makes it possible to distinguish the background from the foreground and to identify the area of reflection, i.e., the imaging of the absorber tube 20 on the surface 16.

In this way, the mean value and standard deviation of the intensity 60 of the thermal radiation can now be derived.

Figure 9:
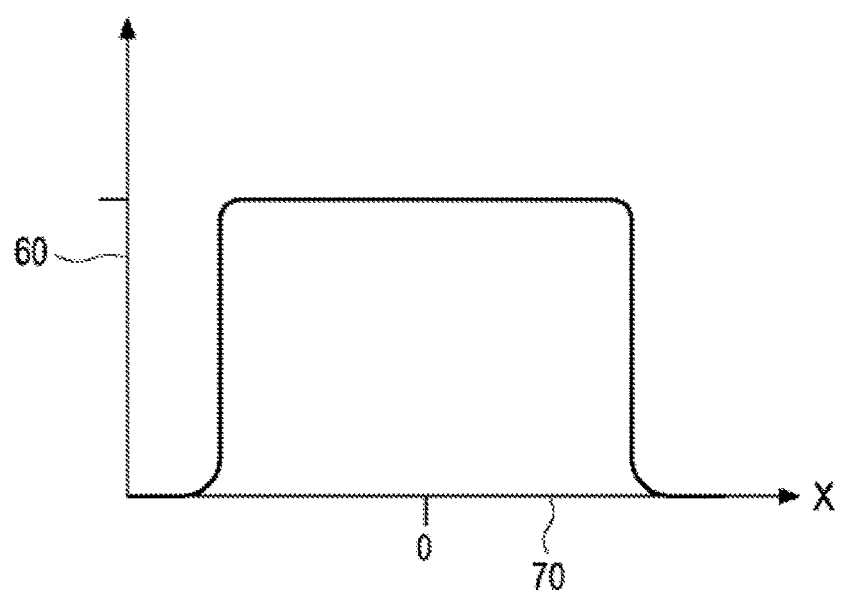
FIG. 9 shows a schematic representation of a rectangular intensity distribution in the orthoimage.

FIG. 9 shows a schematic representation of a rectangular intensity distribution 60 in the orthoimage 45. Such an intensity distribution 60 would be expected if the reflection of the absorber tube 20 did not fill the entire surface 16.

An absolute temperature of the respective absorber tube 20 can be determined as follows.

If the recording device 30 has non-radiometric infrared cameras 32, 34, assigning the minimum and maximum intensity values of the orthoimages 45 in the infrared range to predetermined expected values and interpolating intermediate values.

If the recording device 30 has radiometric infrared cameras 32, 34, correcting an emissivity, the background radiation, and a reflectance of the surface 16 of the respective parabolic trough collector 10.

Figure 10:
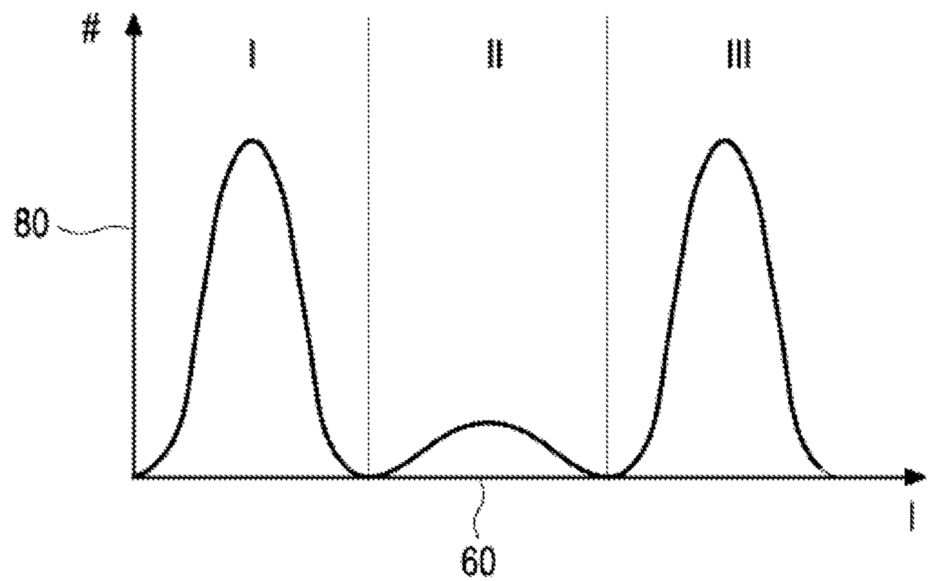
FIG. 10 shows a schematic representation of a classification of the intensities for absorber tubes.
Figure 11:
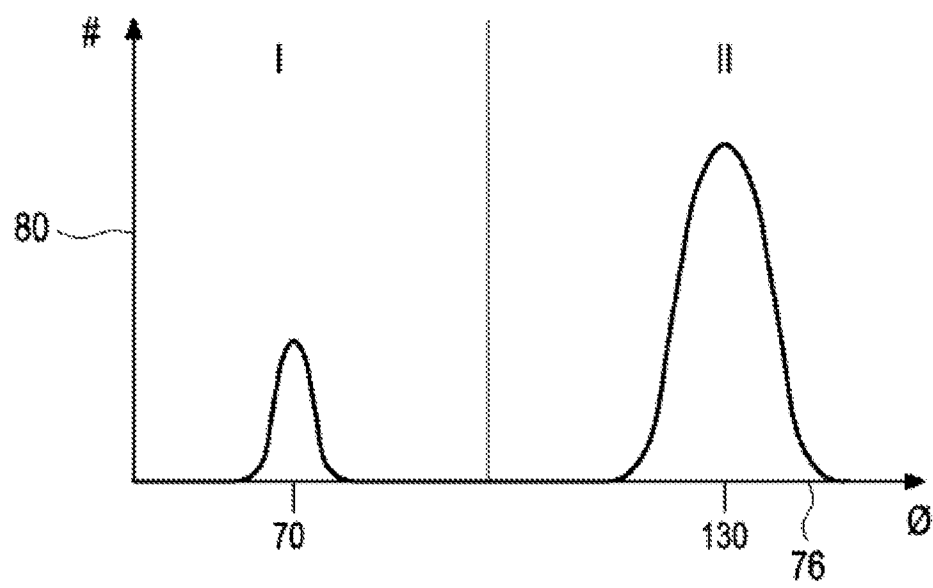
FIG. 11 shows a schematic representation of a classification of the absorber tubes based on the intensity of the IR signal and the diameter, which can be derived from a rectangular function, the flying height, and the geometry of a parabolic trough collector.

FIG. 10 shows a schematic representation of a classification of the intensities for absorber tubes 20, while FIG. 11 shows a schematic representation of a classification of the absorber tubes based on the intensity 60 of the IR signal and the diameter, which can be derived from a rectangular function, the flying altitude 54, and the geometry of a parabolic trough collector 10.

The intensity 60 of the thermal radiation and a width of a rectangular integral of the intensity values of the orthoimage 45 in the infrared range of the respective absorber tube 20 are determined to classify the respective absorber tube 20 according to heat loss.

For example, the absorber tubes 20 can be divided into at least the following classification by determining the intensity 60 and, via the width of the rectangular function, the diameter:

Intact absorber tubes are classified with intensity class I, diameter class II.

Absorber tubes with increased heat losses are classified with intensity class II, diameter class II.

Defective absorber tubes (complete vacuum loss but glass cladding tube intact) are classified as intensity class III, diameter class II.

Absorber tubes with broken glass cladding tube are classified with intensity class III, diameter class I.

Figure 12:
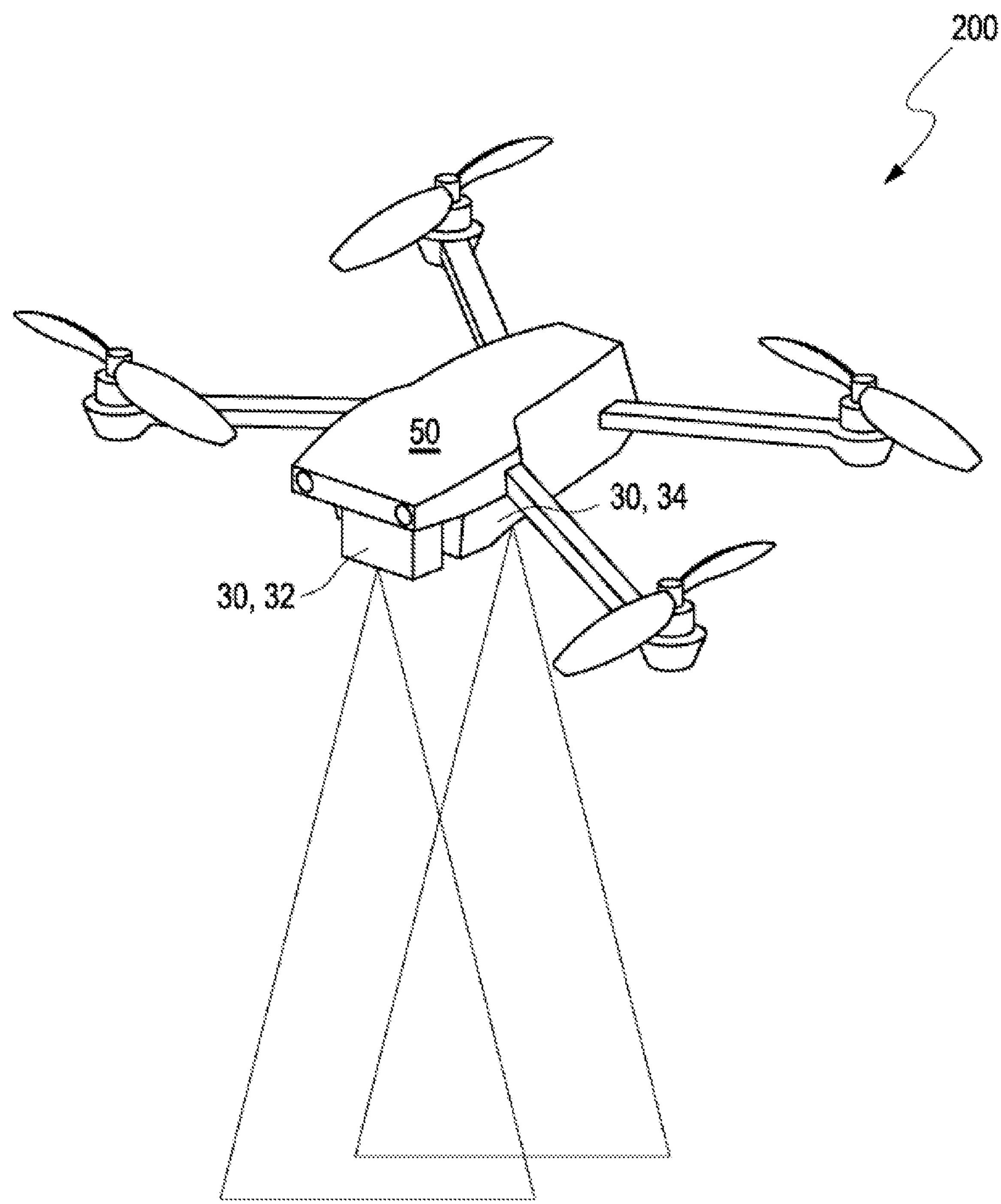
FIG. 12 shows a system for determining a state of a solar thermal field using an unmanned aircraft and a recording device according to an exemplary embodiment of the invention.

FIG. 12 shows a system 200 for determining a state of a solar thermal field 100 using an unmanned aircraft 50 and a recording device 30 according to an exemplary embodiment of an aspect of the invention.

The system 200 comprises at least one recording device 30 for recordings 44 at least in the infrared range, in particular for recordings 42, 44 in the visible range and in the infrared range; and the unmanned aircraft 50 on which the recording device 30 is arranged.

The unmanned aircraft 50 is designed to fly a meandering flight pattern 52 over the solar thermal field 100, in particular to fly autonomously. Furthermore, the unmanned aircraft 50 is designed to fly at a flight altitude 54 of at least 100 m, preferably at a flight altitude 54 of approximately 120 m, above the solar thermal field 100.

For example, drones 50 having a payload that corresponds to a so-called dual camera 30 are advantageously suitable for the proposed method. These are two cameras 32, 34 integrated in the same body and aligned collinearly, one camera 34 of which is sensitive to the infrared (IR) range, while the other camera 32 is sensitive in the visible (RGB) range.

In an alternative embodiment, however, it is also possible to use separate cameras 32, 34 in the RGB range and in the IR range.

For example, resolutions of IR cameras 34 are 640×512 pixels. Fully integrated drones 50 often have a very low resolution in the IR range of 160×120 pixels, for example.

The embodiment shown in FIG. 12 corresponds to a commercially available drone 50 for the hobby area.

REFERENCE SIGNS

10 parabolic trough collector
12 separation
14 focal line
16 surface
20 absorber tube
22 longitudinal extension of absorber tube
24 absorber tube holder
30 recording device
32 camera for visible range
34 camera for IR range
40 mask for orthoimage
42 imaging in the visible range
43 orthoimage in the visible range
44 imaging in the IR range
45 orthoimage in the IR range
46 intensity of an absorber tube
48 imaging of the absorber tube on the surface
49 development of imaging in the mirror
50 aircraft
52 flight pattern
54 flight altitude
60 intensity of thermal radiation
62 IR image of sky
63 IR image of ground
64 IR image of absorber tube
65 image of sky
66 image of ground
67 image of absorber tube
70 transverse direction of parabolic trough collector
72 longitudinal extension of parabolic trough collector
76 width of intensity distribution
80 number
100 solar thermal field

110 longitudinal direction
120 transverse direction
200 system

The invention claimed is:

1. A method for determining a state of a solar thermal field having a plurality of rows, arranged in parallel in a transverse direction of the field, of parabolic trough collectors arranged in succession and having a reflecting reflector surface, which each have a focal point line, in each of which at least one absorber tube is arranged, along their longitudinal extension, wherein at least the following steps are carried out positioning at least one recording device for capturing recordings at least in the infrared range at a predetermined height above the field;

creating recordings of images of absorber tubes, which are reflected by the surface of the respective parabolic trough collectors, by way of the recording device at least in the infrared range, wherein the recording device is moved in a transverse direction transversely to the longitudinal extension over the parabolic trough collectors and the recordings are taken in the form of coherent image sequences by the recording device;

determining an intensity of the thermal radiation of the respective absorber tube by radiometric evaluation of the recordings of the images of absorber tubes reflected by the surface of the respective parabolic trough collectors, at least in the infrared range, wherein at least the following steps are carried out for the radiometric evaluation of the recordings in the visible range and/or in the infrared range:

reading in temperature data of the heat transfer fluid at a point in time of the recordings;

determining a position of the recording device relative to the respective parabolic trough collector;

creating orthoimages of an aperture surface of the respective parabolic trough collector from the recordings in the visible range and/or in the infrared range; and determining the geometry of the respective parabolic trough collector, and tracking of the respective parabolic trough collector according to the position of the sun from the position of the recording device and the orthoimages.

2. The method as claimed in claim 1, wherein an enlarged representation of the absorber tubes is generated as a development of the imaging of the absorber tubes on the surface of the parabolic trough collector.

3. The method has claimed in claim 1, wherein the at least one recording device for recording recordings at least in the infrared range is positioned at a predetermined height above the field such that a segment of the field having a plurality of parabolic trough collectors arranged in parallel is captured simultaneously by the recording device.

4. The method as claimed in claim 1, wherein the at least one recording device is designed for recordings in the visible range and in the infrared range, wherein at least the following steps are carried out positioning the at least one recording device for capturing recordings in the visible range and in the infrared range at the predetermined height above the field;

creating recordings of absorber tubes, which are reflected by the surface of the respective parabolic trough collectors, by way of the recording device in the visible range and in the infrared range, wherein the recording device is moved in the transverse direction transverse to the longitudinal extension over the parabolic trough collectors;

determining the intensity of the thermal radiation of the respective absorber tube by radiometric evaluation of the recordings in the visible range and in the infrared range.

5. The method as claimed in claim 1, wherein, when recordings in the visible range are taken into consideration, the recording device is optically calibrated for a geometric transformation of the recordings in the visible range and/or in the infrared range, in particular wherein cameras of the recording device are calibrated via a photogrammetric approach.

6. The method as claimed in claim 1, wherein at least the following steps are carried out to determine the intensity of the thermal radiation of the absorber tube when recordings in the visible range are taken into consideration, two-dimensionally transforming the recording in the visible range into the recording in the infrared range and superimposing of the two recordings;

creating the orthoimages in the visible range and/or in the infrared range from the recordings in the visible and/or infrared range;

spatially assigning the image information of the orthoimages to the respective absorber tube;

determining the intensity of the thermal radiation of the respective absorber tube by averaging the image information of the orthoimage in the infrared range in a longitudinal extension of the respective absorber tube.

7. The method as claimed in claim 1, wherein furthermore the following steps are carried out to determine the intensity of the thermal radiation of the respective absorber tube summing and averaging the intensity values of orthoimages recorded at an angle offset in the transverse direction in the infrared range over the longitudinal extension of the respective absorber tube;

correcting the intensity values by eliminating the background radiation;

deriving the intensity of the thermal radiation from the averaged and corrected intensity values.

8. The method as claimed in claim 1, wherein at least the following steps are carried out to determine an absolute temperature of the respective absorber tube if the recording device has non-radiometric cameras, assigning the minimum and maximum intensity values of the orthoimages in the infrared range to predetermined expected values and interpolating intermediate values;

if the recording device has radiometric cameras, correcting an emissivity, the background radiation, and a reflectivity of the surface of the respective parabolic trough collector.

9. The method as claimed in claim 1, wherein to classify the respective absorber tube according to heat loss, the intensity of the thermal radiation and a width of a rectangular integral of the intensity values of the orthoimage in the infrared range of the respective absorber tube are determined.

10. The method as claimed in claim 1, wherein the recordings are created by the recording device directly after sunset.

11. The method as claimed in claim 1, wherein the recording device is positioned over the solar thermal field by means of an unmanned aircraft.

12. The method as claimed in claim 11, wherein the recordings are created by means of a meandering flight pattern over the solar thermal field.

13. The method as claimed in claim 11, wherein the recordings are created during a flight movement in the transverse direction of the parabolic trough collectors of the solar thermal field.

14. The method as claimed in claim 11, wherein the recordings are created at a flight altitude of at least 100 m.

15. A system for determining a state of a solar thermal field having a plurality of rows of parabolic trough collectors, which are arranged in succession and have a reflecting reflector surface, arranged in parallel in a transverse direction of the field according to a method as claimed in claim 1, the system at least comprising a recording device for recordings at least in the infrared range, in particular for recordings in the visible range and in the infrared range;

an unmanned aircraft on which the recording device is arranged.

16. The system as claimed in claim 15, wherein the unmanned aircraft is designed to fly a meandering flight pattern over the solar thermal field, in particular to fly autonomously.

17. The system as claimed in claim 15, wherein the unmanned aircraft is designed to fly at a flight altitude of at least 100 m.

18. A computer program product for a method for determining a state of a solar thermal field having a plurality of rows of parabolic trough collectors, which are arranged in succession and have a reflecting reflector surface, arranged in parallel in a transverse direction of the field, which each have a focal line along their longitudinal extension, in which at least one absorber tube is arranged in each case, as claimed in claim 1, wherein the computer program product comprises at least one computer-readable storage medium, which comprises program instructions that are executable on a computer system and cause the computer system to carry out the method, in particular as claimed in claim 1, wherein at least the following steps are performed positioning at least one recording device for capturing recordings at least in the infrared range at a predetermined height above the field;

creating recordings of images of absorber tubes, which are reflected by the surface of the respective parabolic trough collectors, by way of the recording device at least in the infrared range, wherein the recording device is moved in a transverse direction transverse to the longitudinal extension over the parabolic trough collectors;

determining an intensity of the thermal radiation of the respective absorber tube by radiometric evaluation of the recordings of the images of absorber tubes reflected by the surface of the respective parabolic trough collectors, at least in the infrared range.

19. A data processing system for executing a data processing program, which comprises computer-readable program instructions, in order to carry out a method for determining a state of a solar thermal field having a plurality of rows, arranged in parallel in a transverse direction of the field, of parabolic trough collectors arranged in succession and having a reflecting reflector surface which each have a focal point line, in each of which an absorber tube is arranged, along their longitudinal extension as claimed in claim 1.

* * * * *